(12) United States Patent
Jang

(10) Patent No.: US 10,337,966 B2
(45) Date of Patent: Jul. 2, 2019

(54) DATA LOGGING APPARATUS

(71) Applicant: LSIS CO., LTD., Anyang-si, Gyeonggi-do (KR)

(72) Inventor: Sung-Jin Jang, Anyang-si (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 0 days.

(21) Appl. No.: 15/357,664

(22) Filed: Nov. 21, 2016

(65) Prior Publication Data

US 2017/0254728 A1 Sep. 7, 2017

(30) Foreign Application Priority Data

Mar. 3, 2016 (KR) .......................... 10-2016-0025751

(51) Int. Cl.
*G06F 11/34* (2006.01)
*G01M 99/00* (2011.01)
*H04L 12/24* (2006.01)
*G06F 11/07* (2006.01)
*G06F 11/30* (2006.01)

(52) U.S. Cl.
CPC ....... *G01M 99/008* (2013.01); *G06F 11/0736* (2013.01); *G06F 11/0766* (2013.01); *G06F 11/3058* (2013.01); *G06F 11/3072* (2013.01); *G06F 11/3476* (2013.01); *H04L 41/0631* (2013.01); *G06F 2201/86* (2013.01)

(58) Field of Classification Search
CPC .............. G01M 99/008; G06F 11/0736; G06F 11/0766; G06F 11/3058; G06F 11/3072; G06F 11/3476; G06F 2201/86; H04L 41/0631
See application file for complete search history.

(56) References Cited

U.S. PATENT DOCUMENTS 3,704,363 A * 11/1972 Salmassy ............ G06F 11/0727
360/31
7,779,021 B1 8/2010 Smith et al.
2007/0067373 A1* 3/2007 Higgins .............. G06F 11/3013
(Continued)

FOREIGN PATENT DOCUMENTS

CN 103425731 A 12/2013
CN 103718122 A 4/2014
CN 104036359 A 9/2014
(Continued)

OTHER PUBLICATIONS

Japanese Office Action for related Japanese Application No. 2016-217298; action dated Nov. 7, 2017; (5 pages).
(Continued)

*Primary Examiner* — Mischita L Henson
(74) *Attorney, Agent, or Firm* — K&L Gates LLP

(57) ABSTRACT

A data logging apparatus stores communications data transmitted/received between a first apparatus and a second apparatus as log data, determines whether an event occurs based on the communications data, and stores log data within predetermined time periods before and after the time point at which the event has occurred, i.e., between a log start time and a log end time as event data. The data logging apparatus can efficiently store data that is used for analyzing the cause of the event occurring in the first apparatus.

3 Claims, 4 Drawing Sheets

(56) References Cited

U.S. PATENT DOCUMENTS

2013/0139179 A1    5/2013  Roll

FOREIGN PATENT DOCUMENTS

| EP | 2752723 A1 | 7/2014 | |
|---|---|---|---|
| EP | 2903005 A1 | 8/2015 | |
| JP | 2000259239 A | 9/2000 | |
| JP | 2002190088 A | 7/2002 | |
| JP | 2014016930 A | 1/2014 | |
| JP | 2014204396 A | 10/2014 | |
| JP | 5739578 B1 | 6/2015 | |
| JP | 2015-153210 A | 8/2015 | |
| JP | 2015173406 A | 10/2015 | |
| JP | 2016-040721 A | 3/2016 | |
| KR | 10-2007-0097793 A | 10/2007 | |
| KR | 10-2011-0023632 A | 3/2011 | |
| KR | 10-2015-0054061 A | 5/2015 | |
| KR | 10-1568192 B1 | 11/2015 | |
| WO | 2016/027022 A1 | 2/2016 | |
| WO | WO-2018142107 A1 * | 8/2018 | ............... G01H 1/00 |

OTHER PUBLICATIONS

European Search Report dated Jun. 29, 2017 in corresponding European Patent Application No. 16193075.5.
Chinese Office Action for related Chinese Application No. 201610921284.7; action dated Jan. 11, 2019; (6 pages).
Japanese Office Action for related Japanese Application No. 2016-217298; action dated Mar. 26, 2019; (5 pages).

* cited by examiner

DATA LOGGING APPARATUS

CROSS REFERENCE TO RELATED APPLICATION

This application claims the benefit of Korean Patent Application No. 10-2016-0025751, filed on Mar. 3, 2016, entitled "DATA LOGGING APPARATUS", which is hereby incorporated by reference in its entirety into this application.

BACKGROUND

1. Technical Field

The present disclosure relates to a data logging apparatus. More specifically, the present disclosure relates to a data logging apparatus that stores communications data transmitted/received between a first apparatus and a second apparatus as log data, determines whether an event occurs based on the communications data, and stores log data within predetermined time periods before and after the time point at which the event has occurred, i.e., between a log start time and a log end time as event data.

2. Description of the Related Art

In typical industrial fields, a variety of industrial installations are monitored and are operated based on the results of the monitoring. When a failure occurs, the industrial installation is repaired and maintained based on the monitoring result.

To this end, industrial installations conduct communications thereamong, and transmit/receive information on the operating status of the industrial installations and instructions necessary for operating them as communications messages in the form of digital data or as I/O (input/output) signals in the form of analog data.

In addition, if an event occurs in the industrial installations such as an error or failure, a message notifying the event ("event occurrence message") is transmitted to an external apparatus to repair and maintain the industrial installations. In doing so, the industrial installations store only the message notifying the event.

In order to recover the industrial installations from error and failure later on, the communications messages and I/O signals transmitted/received among the industrial installations before and after the error and failure have occurred are analyzed, to derive the cause of the error and failure therefrom.

Existing industrial installations, however, store event occurrence messages only and not communications message and I/O signal. Therefore, there is a problem in that it is difficult to analyze the cause of the error and failure.

SUMMARY

It is an aspect of the present disclosure to provide a data logging apparatus that stores communications data transmitted/received between a first apparatus and a second apparatus as log data, determines whether an event occurs based on the communications data, and, if it is determined that an event has occurred in the first apparatus, stores log data between predetermined log start time and log end time before and after the time point at which the event has occurred as event data, such that data that can be used for analyzing the cause of the event is stored.

It is another aspect of the present disclosure to provide a data logging apparatus that can detect whether an event occurs from a variety of types of apparatuses by setting different criterion ranges to determine whether an event occurs for different types of communications data.

Objects of the present disclosure are not limited to the above-described objects and other objects and advantages can be appreciated by those skilled in the art from the following descriptions. Further, it will be easily appreciated that the objects and advantages of the present disclosure can be practiced by means recited in the appended claims and a combination thereof.

In accordance with one aspect of the present disclosure, a data logging apparatus includes a storage unit that stores communications data transmitted/received between a first apparatus and a second apparatus as log data, a determination unit that determines whether an event occurs based on the communications data, and, if it is determined that an event has occurred in the first apparatus, stores log data between predetermined log start time and log end time before and after the time point at which the event has occurred as event data, and a measurement unit that measures a temperature value and/or a vibration value of the first apparatus.

According to an exemplary embodiment of the present disclosure, communications data transmitted/received between a first apparatus and a second apparatus is stored as log data, and it is determined whether an event occurs based on the communications data, and, if it is determined that an event has occurred in the first apparatus, log data between predetermined log start time and log end time before and after the time point at which the event has occurred is stored as event data, such that data that can be used for analyzing the cause of the event is efficiently stored.

According to another exemplary embodiment of the present disclosure, it can be determined whether an event occurs from a variety of types of apparatuses by setting different criterion ranges to determine whether an event occurs for different types of communications data.

DETAILED DESCRIPTION

Figure 1:
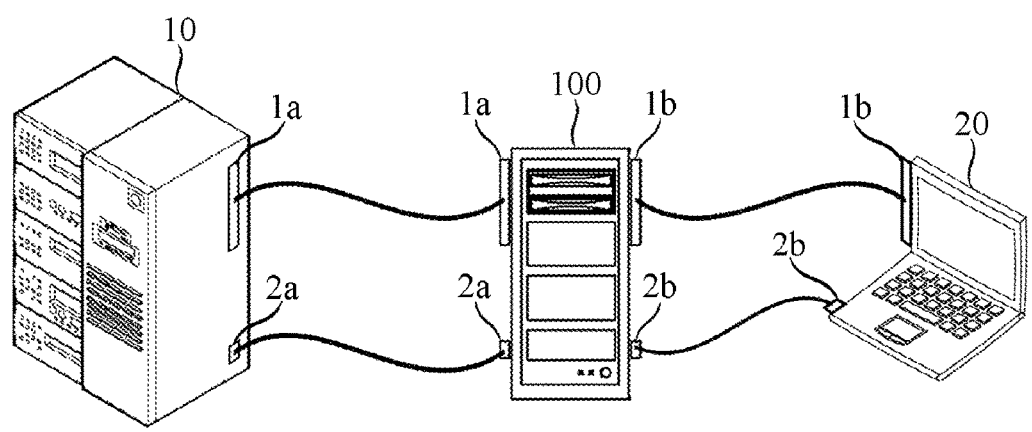
FIG. 1 is a diagram showing connection among a data logging apparatus according to an exemplary embodiment of the present disclosure, a first apparatus and a second apparatus.

The above objects, features and advantages will become apparent from the detailed description with reference to the accompanying drawings. Embodiments are described in sufficient detail to enable those skilled in the art in the art to easily practice the technical idea of the present disclosure. Detailed disclosures of well known functions or configurations may be omitted in order not to unnecessarily obscure the gist of the present disclosure. Hereinafter, embodiments of the present disclosure will be described in detail with reference to the accompanying drawings. Throughout the drawings, like reference numerals refer to like elements.

Figure 2:
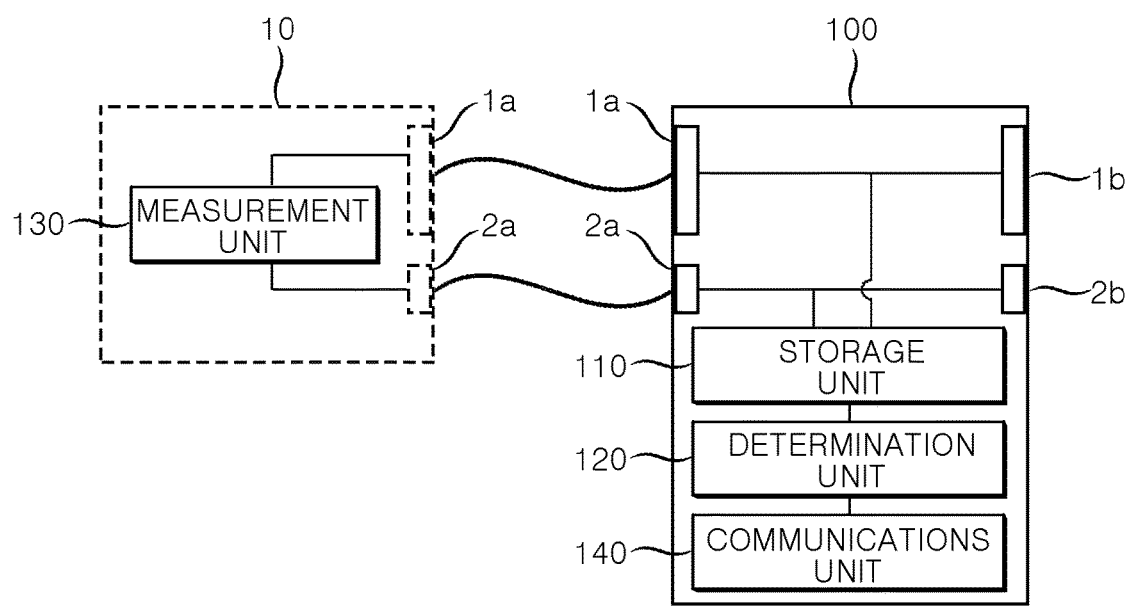
FIG. 2 is a diagram showing a configuration of the data logging apparatus according to an exemplary embodiment of the present disclosure.

FIG. 1 is a diagram showing connection among a data logging apparatus 100 according to an exemplary embodiment of the present disclosure, a first apparatus 10 and a second apparatus 20. FIG. 2 is a diagram showing a configuration of the data logging apparatus 100 according to an exemplary embodiment of the present disclosure.

Referring to FIG. 1, the data logging apparatus 100 according to an exemplary embodiment of the present disclosure may be connected between the first apparatus 10 and the second apparatus 20 and may log communications data transmitted/received therebetween.

The first apparatus 10 may be an industrial installation operated in industrial sites. For example, the first apparatus 10 may be a power apparatus for power generation or power conversion, a relay, a breaker or a motor.

The second apparatus 2 may receive communications data indicative of operating status of the first apparatus 10 therefrom. For example, the second apparatus 20 may be a personal computer, a smartphone, a personal digital assistant (PDA), a tablet computer, and a laptop computer.

The communications data transmitted/received between the first apparatus 10 and the second apparatus 20 may be a communications message and/or an input/output (I/O) signal.

The communications message may be a digital signal containing results of monitoring operating status of the first apparatus 10 and an event occurrence message based on the results. The communications message may be transmitted/received via an industrial computer network protocol in a field bus communications fashion used for real-time distributed control. The standards of the Field Bus communications fashion may include Profibus, ControlNet, WorldFip, P-Net, InterBus, Ethernet-IP, DeviceNet, CAN Open, CAN Kingdom, ADS-Net and FL-Net.

The communications message may be input/output via a first terminal 1a of the first apparatus 10 and a first terminal 1a of the data logging apparatus 100 and may be transmitted/received therebetween. In addition, the communications message may be input/output via a first terminal 1b of the second apparatus 20 and a first terminal 1b of the data logging apparatus 100 and may be transmitted/received therebetween.

The I/O signal may be an analog signal containing results of monitoring operating status of the first apparatus 10. For example, the I/O signal may be voltage, current, power frequency, electric energy, temperature value or vibration value of the first apparatus 10.

The I/O signal may be input/output via a second terminal 2a of the first apparatus 10 and a second terminal 2a of the data logging apparatus 100 and may be transmitted/received therebetween. In addition, the I/O signal may be input/output via a second terminal 2b of the second apparatus 20 and a second terminal 2b of the data logging apparatus 100 and may be transmitted/received therebetween.

That is, the data logging apparatus 100 may receive the communications data containing information on the operating status of the first apparatus 10 as the communications message and/or the I/O signal, may log the received communications message and the I/O signal, and then may transmit it to the second apparatus 20.

Hereinafter, the configuration of the data logging apparatus 100 according to the exemplary embodiment of the present disclosure will be described in detail.

Referring to FIG. 2, the data logging apparatus 100 may include a storage unit 110, a determination unit 120, a measurement unit 130, and a communications unit 140. The data logging apparatus 100 shown in FIG. 2 is merely an exemplary embodiment of the present disclosure, and the elements are not limited to those shown in FIG. 2. Some elements may be added, modified or eliminated as desired.

The storage unit 110 stores communications data transmitted/received between the first apparatus 10 and the second apparatus 20 as log data.

More specifically, the storage unit 110 may store the communications message in the communications data received at the first terminal 1a and the I/O signal received at the second terminal 2a as the log data with respect to a log time period.

The log time period may refer to a period of time from when the communications data containing the communications message and the I/O signal is input to the data logging apparatus 100 to be stored until it is finished.

For example, if the log time period is three days, the storage unit 110 may store the communications messages and I/O signals input to the data logging apparatus 100 from the latest time at which they are input to the data logging apparatus 100 to the three previous days as log data.

That is, the storage unit 110 may store the communications messages and the I/O signals input to the data logging apparatus 100 during the log time as the log data.

The storage unit 110 may be connected in parallel between the first terminal 1a at which communications messages are received and the first terminal 1b from which communications messages are output and may store communications messages as the log data. In addition, the storage unit 110 may be connected in parallel between the second terminal 2a at which I/O signals are received and the second terminal 2b from which I/O signals are output and may store I/O signals as the log data.

In this manner, the communications messages and the I/O signals are transmitted from the first apparatus 10 to the second apparatus 20 while they are stored as the log data, and thus there may be no communications delay or no I/O delay when they are stored in the storage unit 110 as the log data.

Figure 3:
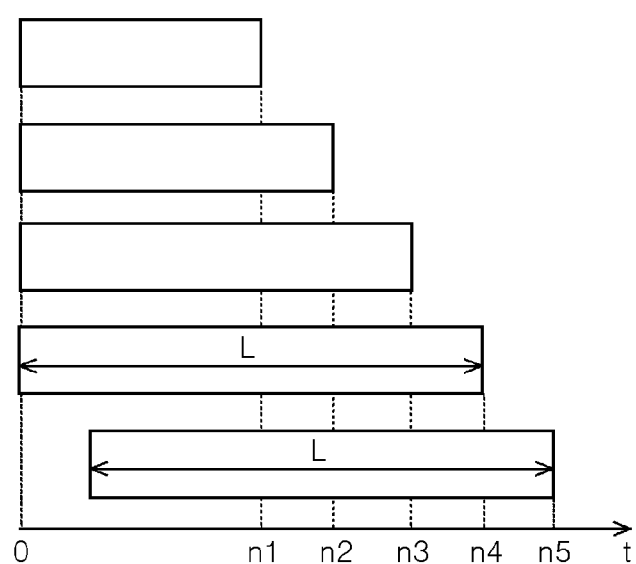
FIG. 3 is a graph showing log data stored in the data logging apparatus according to an exemplary embodiment of the present disclosure over time.

FIG. 3 is a graph showing log data L stored in the data logging apparatus 100 according to an exemplary embodiment of the present disclosure over time.

Referring to FIG. 3, the storage unit 110 may store communications messages and I/O signals input to the data logging apparatus 100 as log data. In addition, during the log time after the communications messages and the I/O signals begin to be input, the storage unit 110 may store all of the communications messages and the I/O signals input at log times n1, n2 and n3 as log data.

From time points n4 and n5 after the log time period has elapsed, the storage unit 110 may store only the latest communications messages and I/O signals within the log time period as log data L.

Further, the storage unit 110 may delete log data stored out of the above log times sequentially. In this manner, the storage unit 110 can utilize the limited data storage space more efficiently.

According to another exemplary embodiment of the present disclosure, the storage unit 110 of the data logging apparatus 100 may store log data L by data size of communications message and I/O signals stored as log data.

More specifically, according to another exemplary embodiment of the present disclosure, if the data size of log data to-be-stored is larger than a predetermined data size, the storage unit 110 of the data logging apparatus 100 may store only the latest communications message and I/O signal having the predetermined data size as log data L.

According to another exemplary embodiment of the present disclosure, the storage unit 110 of the data logging apparatus 100 may determine the data size of log data L to-be-stored depending on the type of the first apparatus 10. For example, if the first apparatus 10 transmits/receives data having a large size, the storage unit 110 of the data logging apparatus 100 may increase the data size of log data L to-be-stored.

By doing so, the storage unit 110 can utilize the limited data storage space more efficiently by varying the data size depending on the type of the first apparatus 10.

The determination unit 120 may determine whether an event occurs in the first apparatus 10 based on the communications data containing the communications message for the I/O signal.

More specifically, the determination unit 120 may set different criterion ranges to determine whether an event occurs for different types of communications data containing communications messages and I/O signals. If communications data input to the first apparatus 10 is out of the criterion range, the determination unit 120 may determine that an event has occurred in the first apparatus 10.

The event may be either an indication that a there is a fault in the operating status of the first apparatus 10 or results of monitoring the operating status of the first apparatus 10 when it is operating normally.

For example, if the first apparatus 10 is a relay and the I/O signal is a voltage signal, the determination unit 120 may set the criterion range to 5 V to 10 V. Then, if the voltage signal input from the first apparatus 10 exceeds the criterion range of 5 V to 10 V, the determination unit 120 may determine that an event has occurred such as a fault in the voltage applied to the relay.

In addition, if it is determined that the event has occurred in the first apparatus 10, the determination unit 120 stores log data within predetermined time periods before and after the event occurrence time, i.e., between the log start time and the log end time in the storage unit 110 as event data.

The log start time may refer to a predetermined time period before the event, and the log end time may refer to a predetermined time period after the event.

The storage unit 110 may include a plurality of data storage devices, such that it may store log data and event data in different data storage devices. For example, the storage unit 110 may store log data in a first data storage device and may move event data among the stored log data, if any, to a second data storage device to store it therein.

In this manner, the storage unit 110 may store log data and event data in different storage spaces to keep them.

Hereinafter, a way how the determination unit 120 stores log data as event data will be described in detail with reference to FIG. 4.

Figure 4:
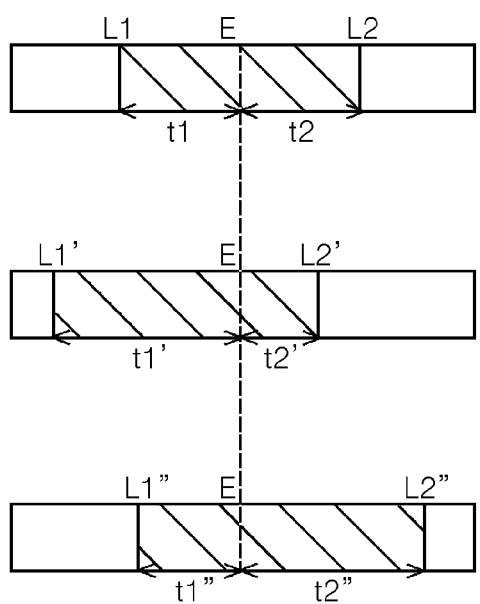
FIG. 4 shows event data stored in the data logging apparatus according to an exemplary embodiment of the present disclosure with different log start times and log end times.

FIG. 4 shows event data stored in the data logging apparatus 100 with different log start times and log end times.

The determination unit 120 may set a predetermined previous time t1 and a predetermined subsequent time t2 equally. Accordingly, the determination unit 120 may store log data falling within the log start time L1 and the log end time L2 each equally distant from the event occurrence time E as event data.

Preferably, the log data is stored in the storage unit 110 in advance, and the time period from the log start time to the log end time of the event data is shorter than the log time of the log data.

According to other exemplary embodiments of the present disclosure, the determination unit 120 of the data logging apparatus 100 may set predetermined previous times t1'; t1" and predetermined subsequent times t2'; t2" differently to store event data.

As shown in FIG. 4, the determination unit 120 of the data logging apparatus 100 according to another exemplary embodiment may set the predetermined previous time t1' longer than the predetermined subsequent time t2'.

Accordingly, the determination unit 120 may set the log start time L1' from the event occurrence time E longer than the log end time L2" to store log data in the storage unit 110 as event data.

The determination unit 120 of the data logging apparatus 100 according to another exemplary embodiment may set the predetermined previous time t1" longer than the predetermined subsequent time t2".

Accordingly, the determination unit 120 may set the log start time L1" from the event occurrence time E shorter than the log end time L2" to store log data in the storage unit 110 as event data.

In this manner, the determination unit 120 may set the predetermined previous times t1'; t2" and the predetermined subsequent times t1';t2" differently to reflect data characteristics required by the different types of events in analyzing the cause of the events occurred in the first apparatus 10.

For example, if an event has occurred in the first apparatus 10, which requires communications data analysis transmitted/received before the event occurrence time E, the determination unit 120 may set the log start time L1' to be longer than the log end time L2'.

On the contrary, if an event has occurred in the first apparatus 10, which requires communications data analysis transmitted/received after the event occurrence time E, the determination unit 120 may set the log end time L2" to be longer than the log start time L1".

The measurement unit 130 is disposed inside the housing of the first apparatus 10 or adjacent to it to measure the temperature value and vibration value of the first apparatus 10. The measurement unit 130 may transmit the measured temperature value and the vibration value as a message via the first terminal 1a or may transmit it as an I/O signal via the second terminal 2b.

To this end, the measurement unit 130 may include a temperature sensor and a vibration sensor.

That is, the temperature value and the vibration value measured by the determination unit 120 may be an example of the above-described communications data.

The determination unit 120 determines whether there is a fault in the first apparatus 10 based on the communications data and, if it is determined that there is a fault in the first apparatus 10, notifies the second apparatus 20 of the fault.

As described above, in addition to determining whether an event occurs in the first apparatus 10 based on the communications data, the determination unit 120 may determine whether there is a fault in the first apparatus 10.

For example, the determination unit 120 may set the maximum temperature of the first apparatus 10 to eighty degrees and, if the temperature value of the first apparatus 10 measured by the measurement unit 130 received as communications data exceeds eighty degrees, may send a signal notifying a fault in the first apparatus 10 to the second apparatus 20.

In addition, if the determination unit 120 determines that there is a fault in the first apparatus 10, the communications unit 140 may send a signal notifying the fault to a user terminal of the first apparatus 10 or the second apparatus 20.

The communications unit 140 may use one of Ethernet communications, Wireless Fidelity (Wi-Fi) communications, CDMA (Code Division Multiple Access) communications and LTE (Long Term Evolution) communications. When Wi-Fi communications are employed, the communications unit 140 may include an additional wireless access point (AP).

In this manner, when a fault occurs in the first apparatus 10, the data logging apparatus 100 sends a signal notifying the fault to the second apparatus 20 and a user terminal of the first apparatus 10 or the second apparatus 20, thereby immediately notifying a manager that the first apparatus 10 is operating abnormally. As a result, it is possible to prevent the first apparatus 10 from being broken or damaged.

The present disclosure described above may be variously substituted, altered, and modified by those skilled in the art to which the present invention pertains without departing from the scope and sprit of the present disclosure. Therefore, the present disclosure is not limited to the above-mentioned exemplary embodiments and the accompanying drawings.

What is claimed is:

1. A data logging apparatus connected between a first apparatus and a second apparatus, the data logging apparatus comprising:
    a storage unit configured to store communications data transmitted/received between the first apparatus and the second apparatus as log data, wherein the communications data includes communications messages and I/O signals,
    wherein the storage unit is coupled to a first terminal that receives communications messages from the first apparatus, and a second terminal that receives I/O signals from the first apparatus,
    wherein the data logging apparatus includes a third terminal that transmits communications messages to the second apparatus, and a fourth terminal that transmits I/O signals to the second apparatus,
    wherein the storage unit is in parallel with the first terminal and the third terminal, and the storage unit is in parallel with the second terminal and the fourth terminal; and
    a determination unit configured to set a criterion range, determine whether an event occurs in the first apparatus based on the communications data and, if it is determined that an event has occurred, to store log data within a time period from a predetermined log start time to a predetermined log end time with respect to an event occurrence time in the storage unit as event data,
    wherein the determination unit sets different criterion ranges to determine whether an event occurs for different types of communications data containing the communications messages and the I/O signals, and determines that an event has occurred if the communications data is out of the criterion ranges,
    a measurement unit located in a housing of the first apparatus and communicably connected to the data logging apparatus, configured to measure a temperature value and/or a vibration value of the first apparatus, wherein the communications data is the temperature value or the vibration value measured by the measurement unit.

2. The data logging apparatus of claim 1, wherein the log start time is a predetermined time period before the event occurrence time, and the log end time is a predetermined time period after the event occurrence time.

3. The data logging apparatus of claim 1, wherein the determination unit determines whether a fault occurs in the first apparatus based on the communications data and, if it is determined that there is a fault in the first apparatus, notifies the second apparatus of the fault.

* * * * *